United States Patent [19]

Beck, Jr. et al.

[11] 3,856,424

[45] Dec. 24, 1974

[54] MEANS FOR FASTENING A STRUCTURAL MEMBER SUBJECT TO CREEP

[75] Inventors: Robert H. Beck, Jr., Dearborn; Kenneth C. Rusch, Detroit, both of Mich.

[73] Assignee: Ford Motor Company, Dearborn, Mich.

[22] Filed: Dec. 3, 1971

[21] Appl. No.: 204,534

[52] U.S. Cl.............................. 403/227, 403/408
[51] Int. Cl............................................. F16b 5/00
[58] Field of Search...... 287/189.36 F; 85/35, 50 R; 52/584, 758 F, 758 D; 403/224, 179, 227, 408, 404; 151/38

[56] References Cited
UNITED STATES PATENTS

| | | | |
|---|---|---|---|
| 271,365 | 11/1883 | Rodney................................ | 151/38 |
| 329,615 | 11/1885 | Andrews.............................. | 151/38 |
| 2,915,152 | 12/1959 | Graham....................... | 287/189.36 F |
| 3,212,387 | 10/1965 | Madansky....................... | 85/50 R |
| 3,298,271 | 11/1967 | Krueger............................ | 85/50 R |
| 3,585,894 | 6/1971 | Brown............................. | 52/758 F |

*Primary Examiner*—Andrew V. Kundrat
*Attorney, Agent, or Firm*—Roger E. Erickson; Keith L. Zerschling

[57] ABSTRACT

Fastening means for connecting a plastic structural member subject to creep to other structural members. The plastic member is compressed between a pair of relatively rigid and more dimensionally durable layers. A resiliently compressible layer is positioned against one of the relatively rigid layers. A bolt-type fastener extends through the plastic part, the rigid layers and the resiliently compressible layer and is tightened to form the connection. The compressible layer maintains the tensile load on the bolt even after a moderate amount of creep of the plastic material. This continued compression of the plastic material between the layers of rigid material prevents loosening of the connection due to creep, reduces the ultimate extent of creep and maintains an effective and durable connection. The layers engaging the plastic member may be roughened or serrated to further reduce the extent of creep.

15 Claims, 3 Drawing Figures

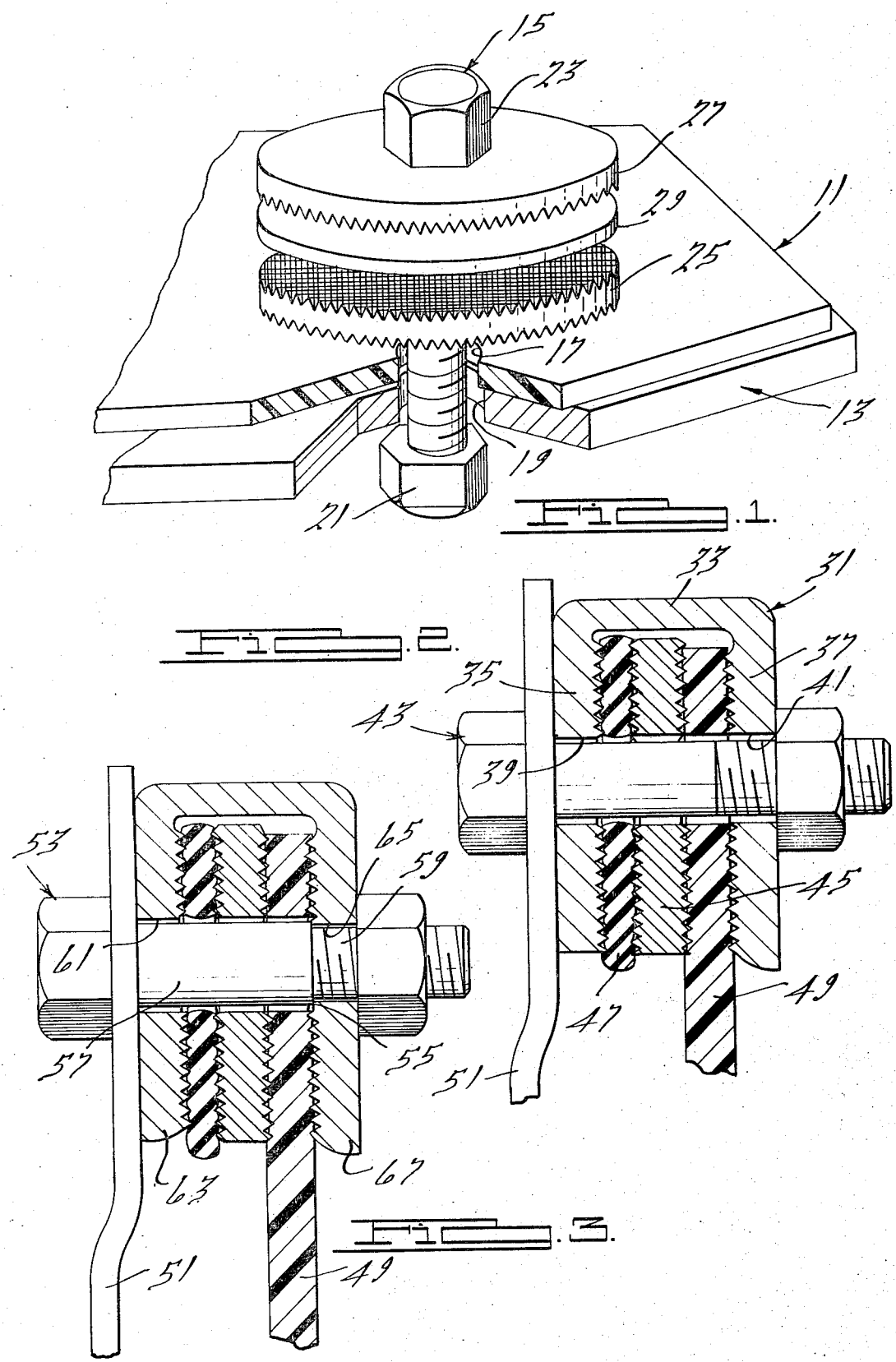

MEANS FOR FASTENING A STRUCTURAL MEMBER SUBJECT TO CREEP

BACKGROUND AND SUMMARY OF THE INVENTION

Many plastics or polymerics are subject to a phenomenon called creep or stress relaxation. Creep is observed as a deformation per unit time under a constant load. Stress relaxation is observed as the change in load magnitude per unit time under a constant deformation. The relatively high creep rates of plastic materials at ordinary temperatures have been their most serious limitation for many structural applications.

This invention provides fastening means for connecting plastic structural members to other structural members which significantly reduce the tendency to creep experienced by the plastic members. This invention provides means to distribute the stress load of a bolt-type fastener over greater portions of the connected materials. The invention also provides fastening means in which a slight reduction in the thickness of the plastic part due to creep will not result in loosening of the connection. Furthermore, the invention provides a fastening means which inherently accommodates for differential thermal expansion rates between plastic and non-plastic materials to maintain a light connection. Finally, the invention provides fastening means to connect one or more structural plastic members which provide economical and durable connections.

A fastening means constructed in accordance with this invention includes a pair of relatively rigid more dimensionally durable members sandwiching the plastic material that is to be fastened. A resiliently compressible member overlies one of the rigid members and a third relatively rigid and durable member overlies with the compressible member. Aligned openings are formed in each of the respective layers or members that receives a threaded or bolt-type fastener. The same fastener may be used to connect the plastic part and its connecting assembly to a second member. The resiliently compressible member provides a tensile load on the bolt-type fastener which is not significantly decreased by small variations in dimensions caused by plastic creep or differential thermal expansion between plastic and the other materials such as steel. One or both of the surfaces engaging the plastic member may be roughened or serrated to provide increased gripping or interaction between the plastic and its contiguous members to further reduce creep of the plastic member.

BRIEF DESCRIPTION OF THE DRAWINGS

FIG. 1 is an exploded perspective view of a preferred embodiment of the invention.

FIG. 2 is a cross sectional view of a second embodiment of the invention.

FIG. 3 is a cross sectional view of a third embodiment of the invention.

DETAILED DESCRIPTION OF THE PREFERRED EMBODIMENT

FIG. 1 of the drawings shows a polymeric or plastic member 11 positioned against a second member 13, constructed of steel, for example. The members are joined by a typical bolt-type threaded fastener 15 extending through the holes 17 and 19. A nut 21 is rotatable relative to the remainder of the bolt 15 to tighten materials between the head 23 of the bolt and the nut. A washer 25 having upper and lower roughened or serrated surfaces is positioned about the bolt and engages the area of the plastic member about its opening 17. A second washer 27 having a serrated surface abuts the head 23 of the bolt and is separated from the first washer 25 by a resiliently compressible washer 29. Washer 29 may be made of any suitable rubber or elastomeric rubber-like material and functions in the assembly as a stiff compression spring. To complete the connection, the nut 21 is progressively tightened about the threaded portion of the bolt until the resilient washer 29 is significantly compressed. The effect of the completed assembly is that the load being transmitted from the member 13 to the plastic member 11 is distributed through washer 25 and member 13 to the area of member 11 between washer 25 and member 13 rather than concentrated immediately about the opening 17. The serrated surface of the washer 25 that engages plastic member 11 effectively grips the area about hole 17 to further reduce the tendency to creep. The serrated surfaces of washers 25 and 27 that engage the resilient washer 29 permit portions of the washer 29 surface to bulge into the recesses of the serrations and thereby to obtain increased compression travel of washer 25 relative to washer 27. The resilient washer 29 maintains a tension on bolt 15 and a tight connection even though the thickness of the plastic material in the area adjacent hole 17 is slightly reduced as a result of an inevitable amount of creep. Furthermore, the resilient washer under compression prevents the loosening of the connection as a result of differential expansion or contraction between the plastic and the metallic members.

DETAILED DESCRIPTION OF ALTERNATE EMBODIMENTS

The second embodiment of the invention shown in FIG. 2 employs a U-shaped clamp 31 having a base portion 33 and two substantially parallel leg portions 35 and 37. The inner surfaces of the leg portions are serrated, preferably in a cross-cut manner. A pair of aligned openings 39 and 41 are formed in the respective legs and receive a bolt-type threaded fastener 43. Positioned about the fastener and between the legs is a washer 45 having serrated faces on each side. Sandwiched between the washer 45 and one of the clamp legs is a resiliently compressible washer 47 similar to washer 29 of the embodiment shown in FIG. 1. Positioned between the other side of the washer 45 and the other leg is the plastic member 49 which is to be connected. The plastic member together with its clamp assembly may be fastened to the second member 51 by the clamp bolt 43 or it may have an entirely independent connection (not shown).

FIG. 3 illustrates another alternative embodiment of the invention similar to that of FIG. 2, but utilizing a stepped diameter bolt 53. A shoulder 55 is formed along the shaft of the bolt separating the larger diameter portion 57 from the smaller diameter portion 59. The hole 61 in leg 63 is larger than the hole 65 in leg 67 of the clamp, and as a result, the shoulder 55 abuts the inner surface of the leg adjacent the hole 63 to prevent over tightening of the clamp.

We claim:

1. Fastener means for connecting a plastic member subject to creep by means of a bolt-type fastener, comprising
    a generally U-shaped clamp member including a base portion and two leg portions,
    said plastic member received between said leg portions, one side of said plastic member engaging the inner surface of one of said leg portions,
    a relatively rigid layer engaging the other side of said plastic member so as to sandwich said plastic member between said one leg portion and said rigid layer,
    a resiliently compressible layer positioned between the inner surface of the other of said leg portions and said relatively rigid layer,
    aligned openings formed in said leg portions, said plastic member and said layers,
    said bolt-type fastener received within said openings and when installed loading said clamp member legs, said plastic member and said layers in compression,
    said resiliently compressible layer loading said fastener in tension.

2. Fastening means according to claim 1,
    said fastener further connecting said clamp member, said plastic member and said layers as a unit to a second member.

3. Fastening means according to claim 1,
    said clamp member and plastic member and said layers being attached as a unit to a second member.

4. Fastening means according to claim 1,
    the surface of leg portion engaging one side of said plastic member being roughened,
    the surface of said relatively rigid layer engaging the other side of said plastic member being roughened.

5. Fastening means according to claim 1,
    the surface of the leg portion engaging one side of said plastic member being serrated,
    the surface of said relatively rigid layer engaging the other side of said plastic member being serrated.

6. Fastening means according to claim 1,
    said bolt-type fastener comprising a threaded bolt having a larger diameter shaft portion, a smaller diameter shaft portion and a shoulder separating the two shaft portions,
    one of said leg portions having a larger diameter opening formed therein receiving the larger diameter shaft portion of said bolt, the other of said leg portions having a smaller diameter opening formed therein receiving the smaller diameter shaft portion of said bolt,
    said shoulder abutting the inner surface of said leg portion having the lesser diameter hole formed therein when the bolt has been fully tightened, said shoulder preventing over tightening of said clamp about said plastic member and said layers.

7. Fastening means according to claim 1,
    said resiliently compressible layer comprising an elastomeric member.

8. Fastening means for joining a plastic structural member subject to creep to a bolt-type fastener comprising
    first, second and third rigid members,
    said plastic member being sandwiched between said first and second rigid members,
    a resilient member being sandwiched between said second and third rigid members,
    said resilient member having greater resiliency, less rigidity and less creep than said plastic member,
    aligned openings formed in said rigid plastic and resilient members receiving said bolt-type fastener,
    said fastener when installed loading said rigid plastic and resilient members in compression whereby the resilient member loads the fastener in tension,
    at least one of the surfaces of said rigid members engaging said plastic material being knurled.

9. Fastening means according to claim 8,
    said knurled surface being serrated.

10. Fastening means according to claim 8,
    said resilient member comprising an elastomeric member.

11. Fastening means according to claim 8,
    at least one of the surfaces of said rigid members engaging said resilient member being knurled.

12. Fastening means for joining a plastic material subject to creep to a second relatively rigid and more dimensionally durable material, said plastic material having one surface engaging one side of said second material,
    a first washer means being more rigid and more dimensionally durable than said plastic material engaging the opposite surface of said plastic material,
    a second washer means being more rigid and more dimensionally durable than said plastic material,
    a resiliently compressible washer means sandwiched between said first and second washer means,
    said resiliently compressible washer means having greater resiliency, less rigidity and less creep than said plastic material,
    aligned openings formed in the washer means and in the joined materials,
    a bolt received within said openings and loading said second material, said plastic material and said washer means in compression whereby the compression of said resiliently compressible washer loads the bolt in tension,
    the surface of said first washer means engaging said plastic material being knurled.

13. Fastening means according to claim 12,
    said knurled surfaces being serrated.

14. Fastening means according to claim 12,
    said resiliently compressible washer means comprising an elastomeric member.

15. Fastening means according to claim 12,
    at least one of the surfaces of said first and second washer means engaging said resiliently compressible washer means being knurled.

* * * * *